(12) United States Patent
Wang et al.

(10) Patent No.: US 7,701,563 B2
(45) Date of Patent: Apr. 20, 2010

(54) APPARATUS FOR MEASURING DECENTER ERROR OF A LENS

(75) Inventors: Sheng-An Wang, Taipei Hsien (TW); Ming-Shan Chan, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 232 days.

(21) Appl. No.: 12/038,999

(22) Filed: Feb. 28, 2008

(65) Prior Publication Data

US 2009/0051904 A1 Feb. 26, 2009

(30) Foreign Application Priority Data

Aug. 24, 2007 (CN) .......................... 200710201453

(51) Int. Cl.
*G01B 9/08* (2006.01)

(52) U.S. Cl. .................. 356/127; 356/244; 359/811; 359/823

(58) Field of Classification Search .................. 356/127
See application file for complete search history.

(56) References Cited

U.S. PATENT DOCUMENTS 2,807,982 A * 10/1957 McLeod ..................... 356/615
4,799,793 A * 1/1989 Feinbloom .................. 356/127

* cited by examiner

*Primary Examiner*—Gregory J Toatley, Jr.
*Assistant Examiner*—Rebecca C Slomski
(74) *Attorney, Agent, or Firm*—Andrew C. Cheng

(57) ABSTRACT

A lens decenter error measuring apparatus including a testing device, a lens supporter, and a lens carrier is disclosed. The testing device is configured for measuring a decenter error of a lens. The lens supporter is configured for receiving the lens. The lens carrier is installed within the lens supporter and includes at least three spheres and an elastic member. The spheres associated with the elastic member constrain the lens when the lens is placed in the lens supporter.

15 Claims, 4 Drawing Sheets

APPARATUS FOR MEASURING DECENTER ERROR OF A LENS

TECHNICAL FIELD

The present invention relates to an apparatus of inspecting optical lenses, and more particularly, to a lens decenter error measuring apparatus for determining decenter error of a lens.

BACKGROUND

Nowadays, following the development of digital products, market demand of small sized optical lenses, such as pick up lenses, digital camera lenses, cell phone camera lenses, has extremely increased. An optical axis of a lens is the axis passing through two centers of curvature of lens surfaces. A mechanical axis passes through the physical center of the lens. If the optical axis of a lens is parallel to but not coincident with the mechanical axis of the lens, a decenter error exists. The decenter error negatively impacts the optical performance of the lens. Therefore, detection of decenter error of a lens is an important issue in the manufacturing of optical lenses.

Conventional methods used for measuring the decenter error of a lens include mechanical measurement and optical measurement. The optical measurement is more precise and popular than the mechanical measurement. Transmissive type and reflective type measurements are commonly utilized in optical measurement. The transmissive type measurement is achieved by projecting a light beam in a cross-line configuration from a collimator focused on a focal plane of the lens. An additional autocollimator is needed for emitting a beam parallel to the focal plane of the lens. The image projected onto the focal plane of the lens is observed through an eyepiece of an autocollimator. When a decenter error is present, the observed image describes a circle and the lens is rotated around a reference axis. A diameter of this circle is proportional with an amount of the decenter error. As a result, the radius of the circle can be taken as the amount of decenter error.

As lens technology develops, optical lenses formed by glass molding and injection forming become more popular. However, with these methods, burs and mouse bites may be formed along the annular sidewall of the lenses. As a result, measurement of decenter error may be less accurate.

In view of the above, there is a need to provide an apparatus for measuring decenter error of a lens.

SUMMARY

In accordance with a present embodiment, a lens decenter error measuring apparatus including an testing device, a lens supporter, and a lens carrier is disclosed. The testing device is configured for measuring decenter error of a lens. The lens supporter is configured for receiving the lens. The lens carrier is installed within the lens supporter and includes at least three spheres and an elastic member. The spheres associated with the elastic member constrain the lens when the lens is placed in the lens supporter.

Other novel features and advantages will be drawn from the following detailed description of at least one preferred embodiment, when considered in conjunction with the attached drawings.

BRIEF DESCRIPTION OF THE DRAWINGS

Many aspects of the present lens decenter error measuring apparatus can be better understood with reference to the following drawings. The components in the drawings are not necessarily drawn to scale, the emphasis instead being placed upon clearly illustrating the principles of the present lens decenter error measuring apparatus. Moreover, in the drawings, like reference numerals designate corresponding parts throughout the several views.

DETAILED DESCRIPTION OF THE PREFERRED EMBODIMENTS

Embodiments of the present lens decenter error measuring apparatus will now be described in detail below and with reference to the drawings.

Figure 1:
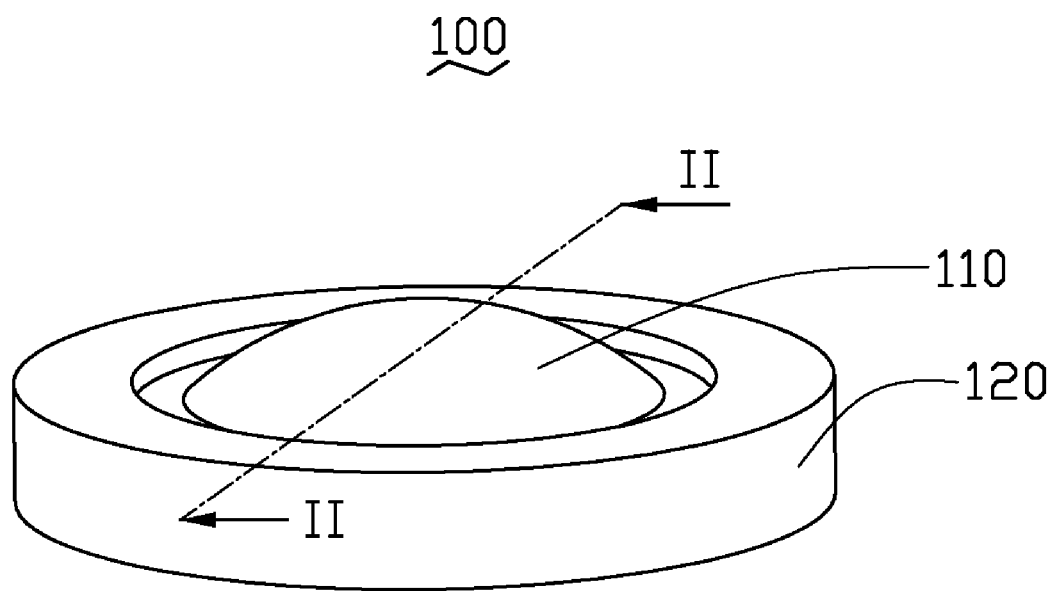
FIG. 1 is a schematic diagram of a lens to be tested in a present embodiment of this invention.
Figure 2:
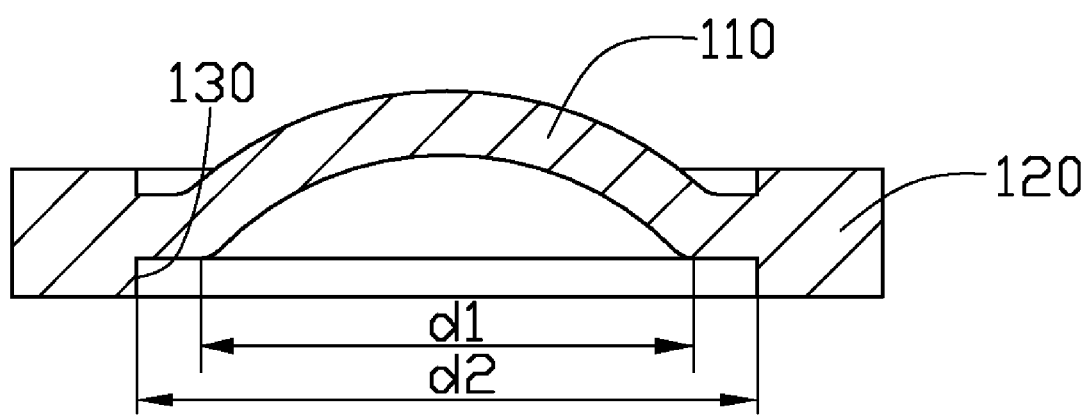
FIG. 2 is a cross-section view of the lens in FIG. 1 along a direction of II-II.

Referring to FIG. 1 and FIG. 2, a structure of a lens 100 to be checked for decenter error in accordance with a first present embodiment is shown. The lens 100 includes a body 110 and a peripheral annular sidewall 120 surrounding the body 110. The lens 100 can be a spherical lens or an aspheric lens. The body 110 can be in a concave/convex shape to diverge/focus light passing through the lens 100. The annular sidewall 120 extends from a periphery of the body in a direction parallel to an optical axis of the lens. The body 110 has an inner diameter d1 and an outer diameter d2. An inner wall 130 is defined around the annular sidewall 120.

Figure 3:
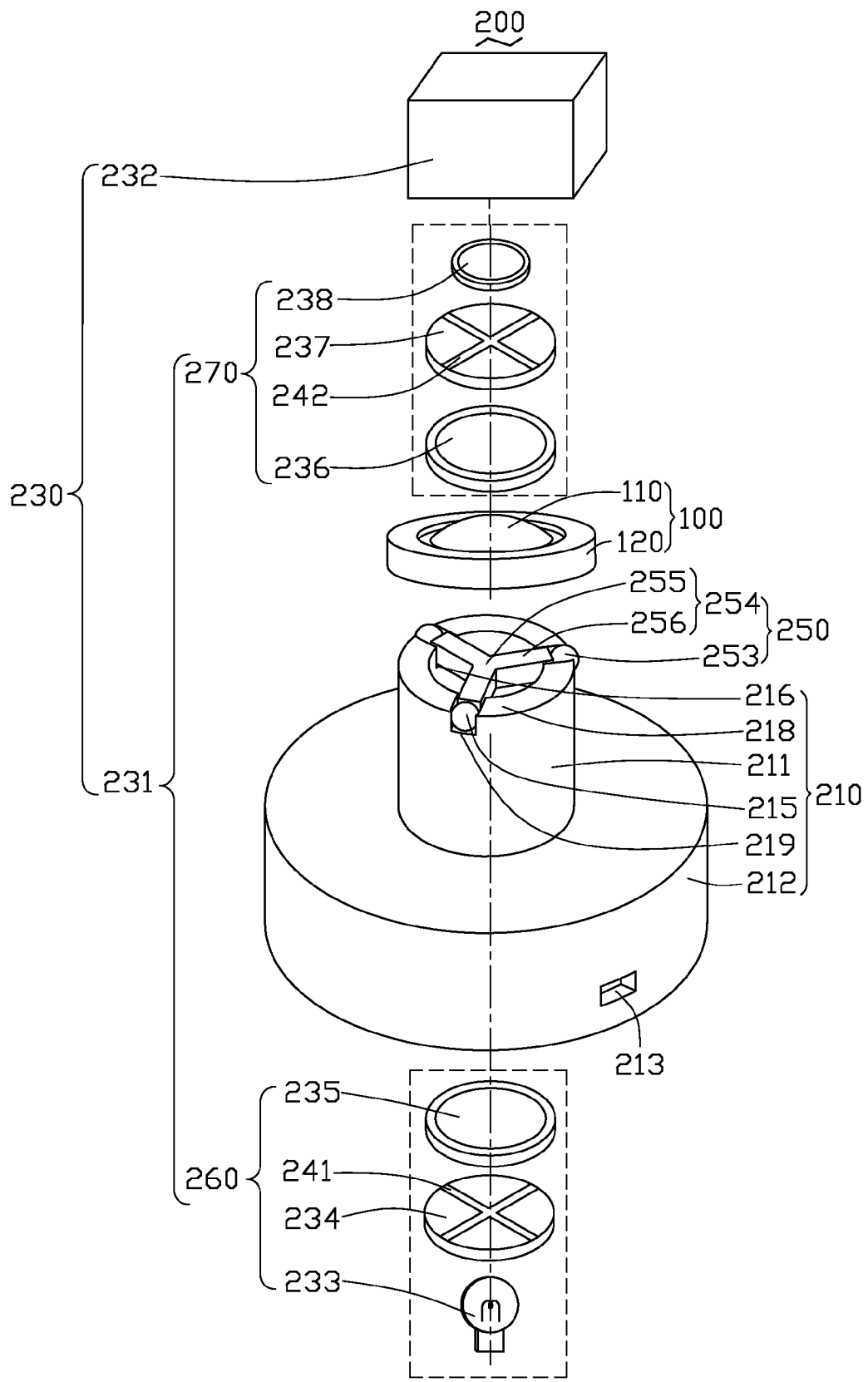
FIG. 3 is a lens decenter error measuring apparatus in the present embodiment of this invention.
Figure 4:
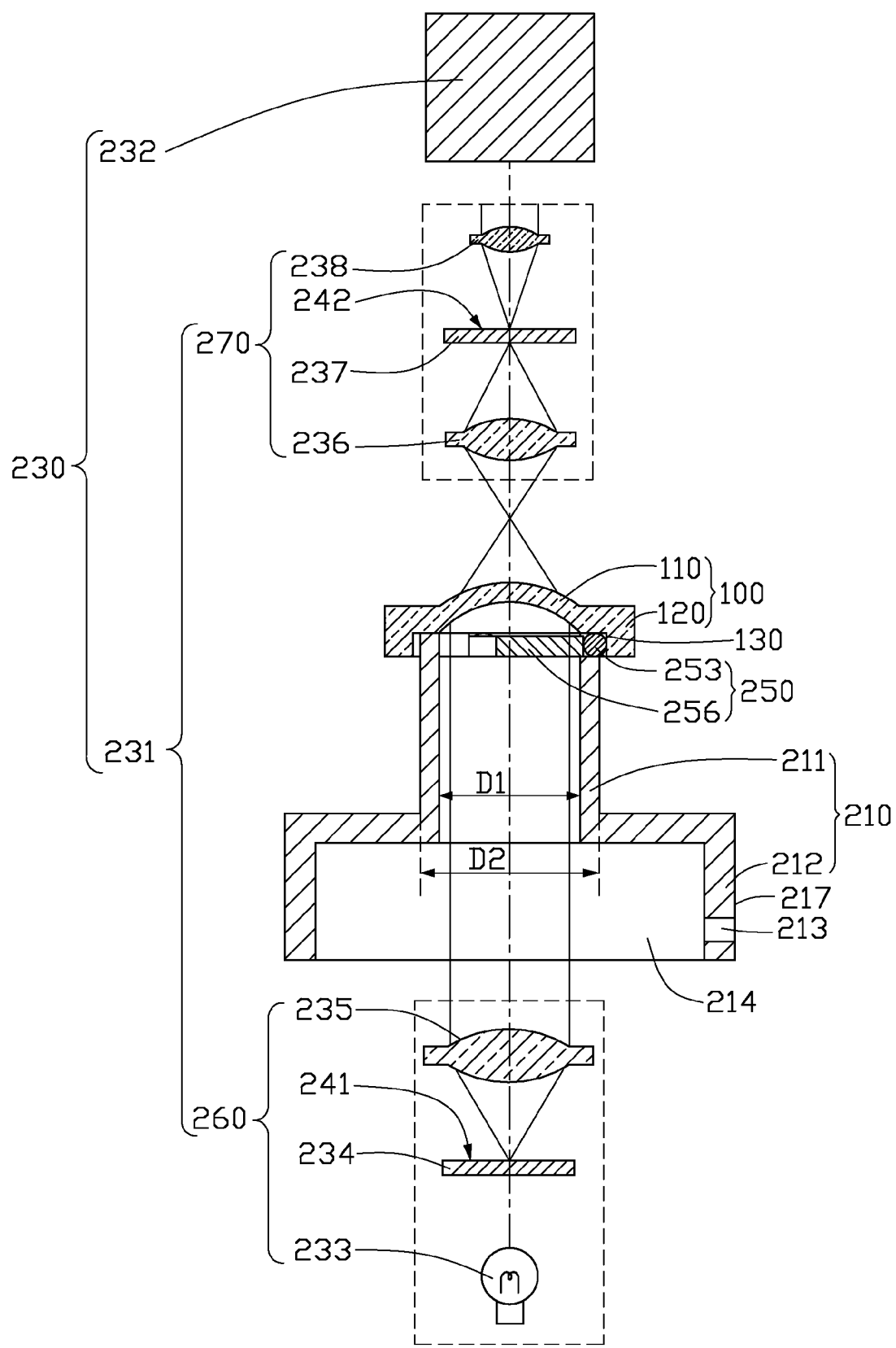
FIG. 4 is a cross-sectional view of the measuring apparatus in FIG. 3.

Referring to FIG. 3 and FIG. 4, a lens measuring apparatus 200 provided in the present embodiment includes a testing device 230, a lens supporter 210, and a lens carrier 250. The lens carrier 250 is installed within the lens supporter 210. The testing device 230 is configured for measuring a decenter error of the lens 100 and includes a microscope 231 configured for measuring the decenter error of the lens 100, and a monitor 232 configured for displaying the decenter error of the lens 100. The lens supporter 210 and the microscope 231 are co-axially disposed.

The microscope 231 can be a transmission type, a reflection type, or a refraction type microscope. In the present embodiment, the microscope 231 is a transmission type microscope. The microscope 231 includes a first lens set 260, and a second lens set 270. The lens 100 is located between the first lens set 260 and the second lens set 270.

The first lens set 260 includes, in a direction along an optical axis, a light source 233, a projection lens 234 having a projection mark 241, and a first diverging lens 235 configured for diverging light, in that order. The light source 233 is configured for emitting an inspection light for measuring. The light source 233 can be a common light source or a laser light according to desired precision of the measurement.

The second lens set 270 includes a second lens 236, a correction lens 237 having a cross-shaped correction mark 242, and a third lens 238 configured for diverging light, in that order. The inspection light emitted from the light source 233 passes these optical components and forms the projection mark 241 and the correction mark 242. The monitor 232 is installed above the microscope 231 to display images of the projection mark 241 and the correction mark 242.

The lens supporter 210 has a step-like structure for receiving the lens 100. The lens supporter 210 includes a first tubular cylindrical wall 211 and a second tubular cylindrical wall 212. The first tubular cylindrical wall 211 is located above the second tubular cylindrical wall 212. A plurality of spaced radial slots 215 are defined in a first end of the first tubular cylindrical wall 211. The first end of the first tubular cylindrical wall 211 is configured for mounting of the lens 100 thereon. A diameter formed by the first tubular cylindrical wall 211 is less than that formed by the second tubular cylindrical wall 212. The second tubular cylindrical wall 212 defines a cavity 214 for receiving the first lens set 260 therein. The lens 100 is positioned above the first tubular cylindrical wall 211. Preferably, an inner diameter formed by the first tubular cylindrical wall 211 is substantially identical to the inner diameter d1 of the body 110 of the lens 100. The first tubular cylindrical wall 211 has a loading plane 218 configured for supporting the lens 100. The slots 215 are defined in the loading plane 218.

The lens carrier 250 is installed inside the first tubular cylindrical wall 211 and is configured for carrying the lens 100 and preventing the lens 100 from being out of level when the lens 100 rotates. The lens carrier 250 includes a plurality of spheres 253 and an elastic member 254. The spheres 253 can be made of metallic material or wood or other material and are received in the slots 215. The spheres 253 are configured for abutting on an inner surface (not shown) of the peripheral annular sidewall of the lens 100. The elastic member 254 is made of an elastic, transparent material. The elastic member 254 has a central portion 255. The elastic member 254 is mounted on the first end of the tubular cylindrical wall 211. The elastic member 254 comprises a plurality of radially extending elongated arms 256 abutting against the respective spheres 253. In this embodiment, three arms 256 are evenly disposed radially at three different directions.

The spheres 253 are respectively received inside the slots 215. In the present embodiment, at least one of the slot 215 tapers in a direction from a center to a peripheral of the first tubular cylindrical wall 211. Each of the slots 215 defines a first opening 216 adjacent to the center of the first tubular cylindrical wall 211 and an opposite second opening 219 farthest away from the center thereof. A width of the first opening 216 is slightly larger than the diameter of the spheres 253. A width of the second opening 219 is slightly smaller than the diameter of the spheres 253. A first end of each arms 256 is configured for abutting against a respective one of the spheres 253 inside the corresponding slot 215. A sum of a width of the elastic member 254 together with the diameter of the corresponding sphere 253 is slightly greater than the diameter formed by the first tubular cylindrical wall 211 allowing a portion of the sphere 253 to be revealed outside the second opening 219 when the sphere 253 is placed inside the slot 215. When the lens 100 is placed in the lens supporter 210, associated with the elastic member 254, the spheres 253 which are partially protruding over the second opening 219 of the first tubular cylindrical wall 211 constrain the inner wall 130 of the annular sidewall 120. Accordingly, the spheres 253 facilitate the lens 100 to rotate and prevent the lens 100 from slanting during rotation relative to the testing device 230.

In practice, the number of the slots 215 arranged in the loading plane 218 of the first tubular cylindrical wall 211 can be other than three. Accordingly, the number of spheres 253 installed on the lens carrier 250 and the number of the arms 256 arranged in the elastic member 254 should be identical to the number of the slots 215.

The testing device 230 can further include a vacuum suction apparatus (not shown) and an angle sensor (not shown). A through opening 213 is defined on the second tubular cylindrical wall 212. When the lens 100 is placed in the testing device 230, the lens supporter 210 is vacuumed by the vacuum suction apparatus to make the lens 100 fit tightly against the loading plane 218 of the first tubular cylindrical wall 211. The angle sensor is configured for detecting a rotating angle of the lens 100.

The inspection light beam emitted from the light source 233 of the testing device 230 passes sequentially through the projection lens 234 having the projection mark 241, the first diverging lens 235, the lens 100, the second lens 236, and the correction lens 237 having the correction mark 242, and the third lens 238. Eventually, the projection mark 241 and the correction mark 242 are projected onto the monitor 232 of the testing device 230. The projection mark 241 is formed by projecting the inspection light through the lens 100. However, the correction mark 242 is not formed by projecting the inspection light through the lens 100. Accordingly, the decenter error of the lens 100 can be determined by comparing positions of the projection mark 241 and the correction mark 242. If the projection mark 241 rotates around the correction mark 242 at a distance (radius), the lens 100 is decentered. Therefore, the decenter error of the lens 100 can be determined by measuring the radius.

Compared to conventional arts, the decenter error of the lens 100 can be directly inspected by measuring the radius of the circle formed by the projection mark 241 circling around the correction mark 242. In addition, the lens 100 is held level by at least three spheres 253 to prevent the lens 100 from slant/tilting during rotation. The present embodiment effectively enhances accuracy of lens inspection.

It will be understood that the above particular embodiments are shown and described by way of illustration only. The principles and features of the present invention may be employed in various and numerous embodiments thereof without departing from the scope of the invention as claimed. The above-described embodiments illustrate the scope of the invention but do not restrict the scope of the invention.

What is claimed is:

1. An apparatus for measuring decenter error of a lens, the lens comprising a circular body and a peripheral annular sidewall surrounding the body, the sidewall extending from a periphery of the body in a direction parallel to an optical axis of the lens, the apparatus comprising:
    a testing device for measuring a decenter error of the lens;
    a lens supporter having a first tubular cylindrical wall, and a plurality of spaced radial slots defined in a first end of the first tubular cylindrical wall, the first end of the first tubular cylindrical wall being configured for mounting of the lens thereon; and
    a plurality of spheres received in the slots, the spheres being configured for abutting on an inner surface of the peripheral annular sidewall of the lens; and
    an elastic member mounted on the first end of the first tubular cylindrical wall, the elastic member abutting against the spheres.

2. The apparatus as claimed in claim 1, wherein at least one of the slots tapers in a direction from a center to a peripheral of the first tubular cylindrical wall.

3. The lens decenter error measuring apparatus as claimed in claim 1, wherein an inner diameter of the first tubular cylindrical wall is substantially equal to the inner diameter of the body of the lens.

4. The lens decenter error measuring apparatus as claimed in claim 3, wherein each of the slots has a first opening adjacent to the center of the first tubular cylindrical wall and an opposite second opening farthest away from the center thereof, a width of the first opening being slightly larger than the diameter of the sphere; a width of the second opening being slightly smaller than the diameter of the sphere.

5. The lens decenter error measuring apparatus as claimed in claim 4, wherein a sum of a width of the elastic member and a diameter of the sphere is slightly greater than a diameter formed by the first tubular cylindrical wall.

6. The lens decenter error measuring apparatus as claimed in claim 1, wherein the testing device comprises a microscope configured for measuring the decenter error of the lens.

7. The lens decenter error measuring apparatus as claimed in claim 6, wherein the testing device comprises a monitor configured for displaying the decenter error.

8. The lens decenter error measuring apparatus as claimed in claim 7, wherein the microscope comprises a first lens set, and a second lens set; the first lens set comprising, in a direction along an optical axis, a light source, a projection lens having a projection mark, a first diverging lens configured for diverging light.

9. The lens decenter error measuring apparatus as claimed in claim 8, wherein the second lens set comprises a second lens, a correction lens having a cross-shaped correction mark, and a third lens.

10. The lens decenter error measuring apparatus as claimed in claim 8, wherein the lens supporter and the microscope are co-axially disposed.

11. The lens decenter error measuring apparatus as claimed in claim 1, wherein the testing device comprises an angle sensor configured for detecting a rotating angle of the lens.

12. The lens decenter error measuring apparatus as claimed in claim 4, wherein a through opening is defined in the lens supporter.

13. The lens decenter error measuring apparatus as claimed in claim 12, wherein the testing device further comprises a vacuum suction apparatus.

14. The apparatus as claimed in claim 1, wherein the elastic member comprises a plurality of radially extending elongated arms abutting against the respective spheres.

15. The apparatus as claimed in claim 1, wherein the elastic member is made of a transparent material.

* * * * *